United States Patent
Silva et al.

(10) Patent No.: US 10,938,589 B2
(45) Date of Patent: Mar. 2, 2021

(54) COMMUNICATIONS ANALYSIS AND PARTICIPATION RECOMMENDATION

(71) Applicant: INTERNATIONAL BUSINESS MACHINES CORPORATION, Armonk, NY (US)

(72) Inventors: Asima Silva, Holden, MA (US); Richard Gorzela, Billerica, MA (US); Jamie Mae Stockton, Groton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/205,634

(22) Filed: Nov. 30, 2018

(65) Prior Publication Data

US 2020/0177404 A1    Jun. 4, 2020

(51) Int. Cl.
| | | |
|---|---|---|
| *H04L 12/18* | (2006.01) | |
| *G06Q 10/10* | (2012.01) | |
| *G06F 16/635* | (2019.01) | |
| *G06F 40/30* | (2020.01) | |

(52) U.S. Cl.
CPC ........ *H04L 12/1822* (2013.01); *G06F 16/635* (2019.01); *G06F 40/30* (2020.01); *G06Q 10/109* (2013.01); *H04L 12/1831* (2013.01)

(58) Field of Classification Search
CPC ............. H04L 12/1822; H04L 12/1831; G06F 16/635; G06F 40/30; G06Q 10/109
See application file for complete search history.

(56) References Cited

U.S. PATENT DOCUMENTS

| | | | |
|---|---|---|---|
| 4,850,005 A | 7/1989 | Hashimoto | |
| 7,127,398 B1 * | 10/2006 | Yamagishi | .......... G10L 15/1815 |
| | | | 704/270 |
| 7,603,273 B2 | 10/2009 | Poirier | |
| 9,411,506 B1 * | 8/2016 | Prado | .................. G06F 3/04817 |
| 10,158,734 B2 * | 12/2018 | Brune | .................... H04L 67/26 |
| 10,228,825 B1 * | 3/2019 | Beck | .................... H04L 41/142 |
| 2006/0218032 A1 | 9/2006 | Patrick | |
| 2006/0282265 A1 | 12/2006 | Grobman | |
| 2008/0077416 A1 | 3/2008 | Hetrick | |
| 2008/0275701 A1 | 11/2008 | Wu | |
| 2011/0153530 A1 * | 6/2011 | Nachimson | ............... G06F 8/74 |
| | | | 706/12 |

(Continued)

OTHER PUBLICATIONS

"Conference Call Analytics to Generate Meeting Moderation Recommendations", ip.com, IP.com No. IPCOM000205838D, IP.com Electronic Publication Date: Apr. 5, 2011, 8 pps.

*Primary Examiner* — Arvin Eskandarnia
(74) *Attorney, Agent, or Firm* — Steven M Bouknight (57) ABSTRACT

An embodiment of the invention may include a method, computer program product and computer system for communications analysis and participation recommendation. The method, computer program product and computer system may include a computing device which may collect and analyze communications of a user. The computing device may identify a user contribution pattern for the user. The computing device may analyze one or more conversations and identify a conversation relevant to the user based on the identified user contribution pattern. The computing device may generate, in response to identifying a relevant conversation, a notification to the user of the relevant conversation.

20 Claims, 6 Drawing Sheets

(56) References Cited

U.S. PATENT DOCUMENTS

| | | |
|---|---|---|
| 2011/0320273 A1 | 12/2011 | Miranda-Steiner |
| 2012/0084349 A1* | 4/2012 | Lee .................... G06Q 30/0251 709/203 |
| 2013/0085824 A1* | 4/2013 | Alwan ............... G06Q 30/0277 705/14.7 |
| 2013/0144682 A1* | 6/2013 | Dhara ............... G06Q 30/0201 705/7.29 |
| 2014/0129614 A1 | 5/2014 | Priya |
| 2014/0164305 A1 | 6/2014 | Lynch et al. |
| 2015/0032829 A1* | 1/2015 | Barshow ................. H04L 51/16 709/206 |
| 2015/0033155 A1* | 1/2015 | Camacho ................ H04L 51/32 715/758 |
| 2015/0089424 A1 | 3/2015 | Duffield |
| 2016/0239537 A1 | 8/2016 | Cunico |
| 2016/0316059 A1 | 10/2016 | Nuta et al. |
| 2016/0380950 A1 | 12/2016 | Foley |
| 2016/0381097 A1 | 12/2016 | Bank |
| 2017/0061019 A1 | 3/2017 | Chitta |
| 2018/0268051 A1 | 9/2018 | Goldstein et al. |
| 2019/0042557 A1* | 2/2019 | Okubo .................. G06F 40/103 |

\* cited by examiner

COMMUNICATIONS ANALYSIS AND PARTICIPATION RECOMMENDATION

BACKGROUND

The present invention relates generally to a method, system, and computer program for communications analysis. More particularly, the present invention relates to a method, system, and computer program for analyzing communications and identifying opportunities for a user to participate in a conversation.

Meetings are a typical part of most people's professional lives occurring in almost every profession. Increasingly, with the proliferation of technology and globalization, meetings take place electronically using a variety of meeting applications. The electronic meeting applications allow for real-time point-to-point communications as well as multi-cast communications from one or more senders to one or more receivers. Further, electronic meeting applications offer data streams of text-based messages, voice and video chat to be shared simultaneously, across geographically dispersed locations. Electronic meeting applications include applications for meetings, training events, lectures, or presentations from a web-connected computer to other web-connected computers.

BRIEF SUMMARY

An embodiment of the invention may include a method, computer program product and computer system for communications analysis and participation recommendation. The method, computer program product and computer system may include a computing device which may collect and analyze communications of a user. The computing device may identify a user contribution pattern for the user. The computing device may analyze one or more conversations and identify a conversation relevant to the user based on the identified user contribution pattern. The computing device may generate, in response to identifying a relevant conversation, a notification to the user of the relevant conversation.

BRIEF DESCRIPTION OF THE DRAWINGS

FIG. 1b illustrates example operating modules of the communications analysis and participation recommendation program of FIG. 1a;

DETAILED DESCRIPTION

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for analyzing communications, creating user contribution patterns for specific users and identifying opportunities for a specific user to participate in a conversation based on the user's contribution pattern. Currently, if a person is late to a meeting or not present for a meeting, the person can only find out what happened in the meeting by reading a transcription of the entire meeting, reading documents presented at the meeting, reading message boards from the meeting, or asking someone who was present at the meeting. Current technology does not allow for the analysis of a person's meeting contributions in order to create a user contribution pattern. Further, current technology does not allow for analyzing all meetings at a person's place of work using the contribution pattern for the user to identify opportunities for the user to participate regardless of whether the person is present for the meeting or not. For example, a sales manager may miss the first 15 minutes of a meeting, where a sales associate is presenting a sales proposal. During the meeting, the sales associate discusses a potential sales barrier regarding delivery schedule, but the sales associate cannot address it satisfactorily since he is not a manager who can address production priorities. However, embodiments of the present invention may notify the sales manager and summarize the issue for the sales manager. Once the sales manager joins the meeting or at a later time, the sales manager can speak with the sales associate and address the sales barrier. Thus, embodiments of the invention allow for meeting to flow uninterrupted and prevent meeting attendees from needing summaries of relevant points. As a further example, a new employee may be attending a retrospective meeting where his team is discussing issues that occurred during before the new employee was hired. One issue raised during the meeting may be the efficiency of interaction with the accessibility testing team. Embodiments of the present invention may notify the new employee that a specific tool has been proposed for accessibility testing in the past based on the new employee's contribution pattern and that when the tool was proposed in a previous meeting the main issue with using the tool was licensing cost. The new employee may be familiar with test tool alternatives and be able to make a viable proposal without re-raising a prior failed proposal. Thus, embodiments of the present invention provide a means for notifying users of opportunities to contribute meaningfully to a conversation without requiring a summary, interrupting the conversation, and/or repeating previous communications by other users.

Reference will now be made in detail to the embodiments of the present invention, examples of which are illustrated in the accompanying drawings, wherein like reference numerals refer to like elements throughout. Embodiments of the invention are generally directed to a system for communications analysis and response recommendation.

Figure 1A:
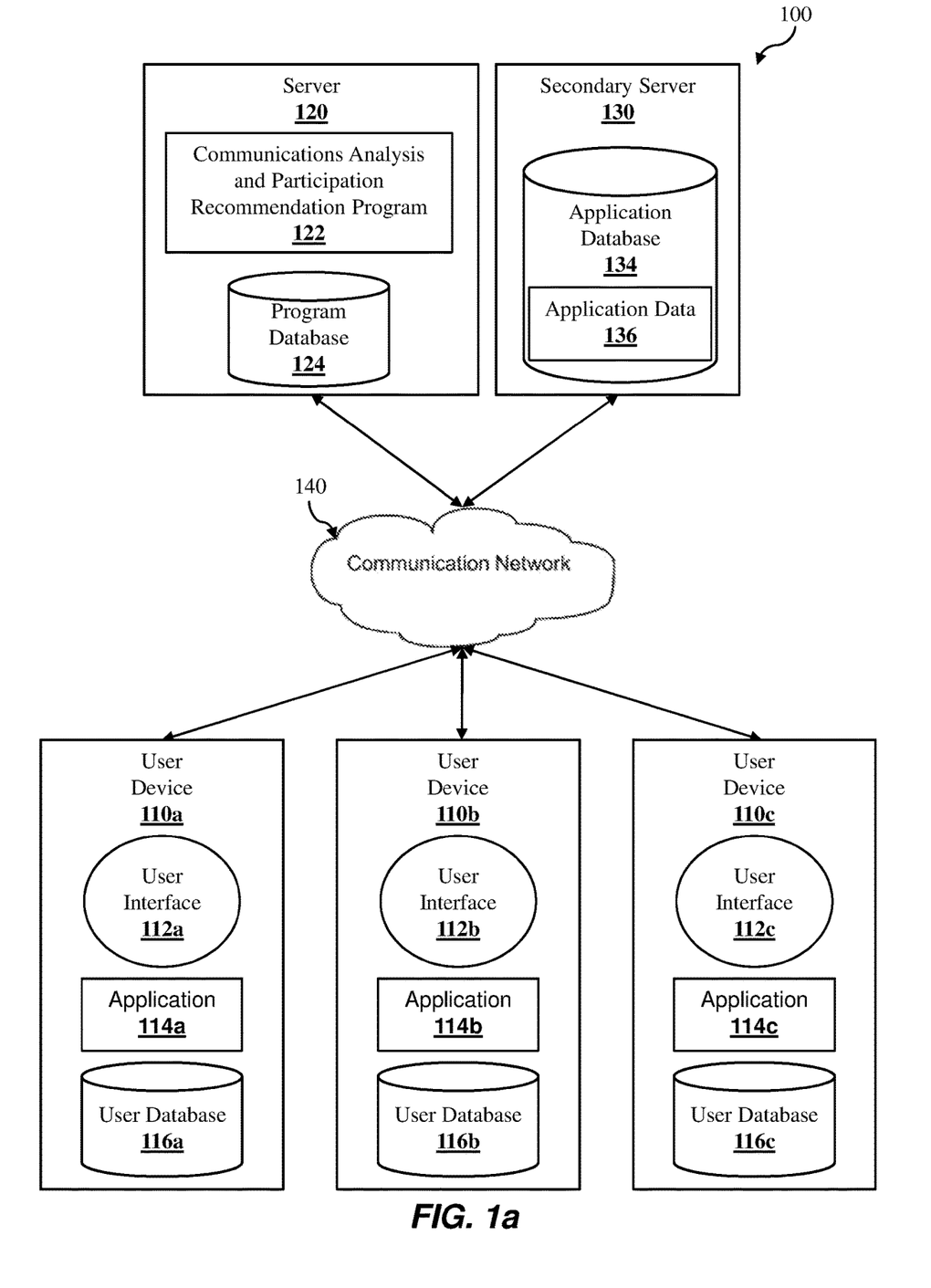
FIG. 1a illustrates a system for a communications analysis and participation recommendation, in accordance with an embodiment of the invention.

FIG. 1 illustrates a communications analysis and participation recommendation system 100, in accordance with an embodiment of the invention. In an example embodiment, the communications analysis and participation recommendation system 100 includes user devices 110a, 110b, 110c, a server 120, and a secondary server 130 interconnected via network 140.

In the example embodiment, the network 140 is the Internet, representing a worldwide collection of networks and gateways to support communications between devices connected to the Internet. The network 140 may include, for example, wired, wireless or fiber optic connections. In other embodiments, the network 140 may be implemented as an intranet, a local area network (LAN), or a wide area network (WAN). In general, the network 140 can be any combination of connections and protocols that will support communications between the user devices 110a, 110b, 110c, the server 120, and the secondary server 130.

The user devices 110a, 110b, 110c may include a user interfaces 112a, 112b, 112c, applications 114a, 114b, 114c, and user databases 116a, 116b, 116c. In the example embodiment, the user devices 110a, 110b, 110c may be a desktop computer, a notebook, a laptop computer, a tablet computer, a thin client, or any other electronic device or computing system capable of storing compiling and organizing audio, visual, or textual content and receiving and sending that content to and from other computing devices, such as the server 120, and the secondary server 130 via the network 140. While three user devices 110a, 110b, 110c are depicted, it can be appreciated that any number of user devices may be part of the communications analysis and participation recommendation system 100 including more than or less than three. In some embodiments, the user devices 110a, 110b, 110c include a collection of devices or data sources. The user devices 110a, 110b, 110c are described in more detail with reference to FIG. 3.

The user interfaces 112a, 112b, 112c include components used to receive input from a user on the user devices 110a, 110b, 110c and transmit the input to the communications analysis and participation recommendation program 122 residing on the server 120, or conversely to receive information from the communications analysis and participation recommendation program 122 and display the information to users on the user devices 110a, 110b, 110c. In an example embodiment, the user interfaces 112a, 112b, 112c use a combination of technologies and devices, such as device drivers, to provide a platform to enable users of the user devices 110a, 110b, 110c to interact with the communications analysis and participation recommendation program 122. In the example embodiment, the user interfaces 112a, 112b, 112c receive input, such as but not limited to, textual, visual, or audio input received from a physical input device, such as but not limited to, a keypad, mouse, camera, and/or a microphone.

The applications 114a, 114b, 114c may be any electronic communications application including, but not limited to, downloadable applications and online applications. The applications 114a, 114b, 114c may be for example, but are not limited to, meeting applications, social networking applications, and messaging applications, etc. For example, the applications 114a, 114b, 114c may be, but are not limited, to Webex®, Google+ Hangouts®, Skype®, Slack®, Evernote®, GoToMeeting®, IBM® Connections, Microsoft Outlook®, Gmail®, and Lotus Notes® etc. While only a single application 114a, 114b, 114c are illustrated for each of the user devices 110a, 110b, 110c, respectively, it can be appreciated that any number of applications 114a, 114b, 114c may be part of the communications analysis and participation recommendation system 100 including one or more than one depending on the user. The data associated with the applications 114a, 114b, 114c may be stored on the secondary server 130 associated with the applications 114a, 114b, 114c as application data 136. For example, the user devices 110a, 110b, 110c may belong to three co-workers who each utilize a meeting application to collaborate. Thus, the meeting application would be the applications 114a, 114b, 114c on each of the co-workers computers, i.e. the user devices 110a, 110b, 110c, and the data associated with the applications 114a, 114b, 114c would be stored on the meeting application server, i.e., secondary servers 130 as application data 136. Alternatively, the data associated with the applications 114a, 114b, 114c, i.e. the application data 136, may be stored on the user databases 116a, 116b, 116c, associated with the user devices 110a, 110b, 110c.

The user databases 116a, 116b, 116c may store any data associated with the user devices 110a, 110b, 110c including, but not limited to, audio, visual, and textual files. Further, the user databases 116a, 116b, 116c may store the data associated with the applications 114a, 114b, 114c, i.e. the application data 136. The user databases 116a, 116b, 116c are described in more detail with reference to FIG. 3.

The secondary server 130 may include an application database 134. While only a single secondary server 130 is illustrated, it can be appreciated that any number of secondary servers 130 may be part of the communications analysis and participation recommendation system 100 including one or more depending on the user and the number of the applications 114a, 114b, 114c. In the example embodiment, the secondary server 130 may be a desktop computer, a notebook, a laptop computer, a tablet computer, a thin client, or any other electronic device or computing system capable of storing compiling and organizing audio, visual, or textual content and receiving and sending that content to and from other computing devices, such as the user devices 110a, 110b, 110c and the server 120 via the network 140. In some embodiments, the secondary server 130 may include a collection of devices or data sources. The secondary server 130 is described in more detail with reference to FIG. 3.

The application database 134 may be a collection of the application data 136. The application data 136 may be data associated with the applications 114a, 114b, 114c including, but not limited to, audio, visual, and textual files. For example, the application data 136 may include, but is not limited to, meeting transcripts, meeting notes, meeting presentations, meeting documents, meeting message boards, etc. associated with the applications 114a, 114b, 114c. The application data 136 stored in application database 134 located on the secondary server 130 or on the user devices 110a, 110b, 110c, or on other secondary databases may be accessed through the network 140. The application database 134 is described in more detail with reference to FIG. 3.

The server 120 may include the communications analysis and participation recommendation program 122 and the program database 124. In the example embodiment, the server 120 may be a desktop computer, a notebook, a laptop computer, a tablet computer, a thin client, or any other electronic device or computing system capable of storing compiling and organizing audio, visual, or textual content and receiving and sending that content to and from other computing devices, such as the user devices 110a, 110b, 110c and the secondary server 130 via the network 140. In an example embodiment, the server 120 may be resident in the user devices 110a, 110b, 110c. In yet another embodiment, the server 120 may be separate from the user devices 110a, 110b, 110c and may reside at a secondary location communicating with the user devices 110a, 110b, 110c via the network 140. The server 120 is described in more detail with reference to FIG. 3.

The communications analysis and participation recommendation program 122 is a program capable of identifying a user contribution pattern based on the user's conversation history and generating a notification to the user of opportunities to participate in a conversation to which the user may or may not be in attendance. In an example embodiment, the conversation may be, but it not limited to, a meeting. The communications analysis and participation recommendation program 122 may collect communications of one or more users from the user devices 110a, 110b, 110c, and the secondary server 130. The communications analysis and participation recommendation program 122 may analyze the characteristics of the users' communications and identify a user contribution pattern for each of the users. The communications analysis and participation recommendation program 122 may then monitor and/or analyze communications that occur on any of the user devices 110a, 110b, 110c connected to the communications analysis and participation recommendation system 100 and identify opportunities for a user to participate based on the user's contribution pattern. For example, the communications analysis and participation recommendation program 122 may identify concepts and questions raised during a meeting that a user has responded to in the past and whether or not the user's past response was positively received by the other meeting attendees. The communications analysis and participation recommendation program 122 may then notify the user of an identified opportunity to participate. The communications analysis and participation recommendation program 122 is described in more detail with reference to FIG. 1b.

The program database 124 may contain any data collected, used, and/or created by the communications analysis and participation recommendation program 122 including, but not limited to, audio, visual, and textual files. For example, the program database 124 may include, but is not limited to, data collected from the user devices 110a, 110b, 110c and the application data 136. The program database 124 is described in more detail above and with reference to FIG. 3.

Figure 1B:
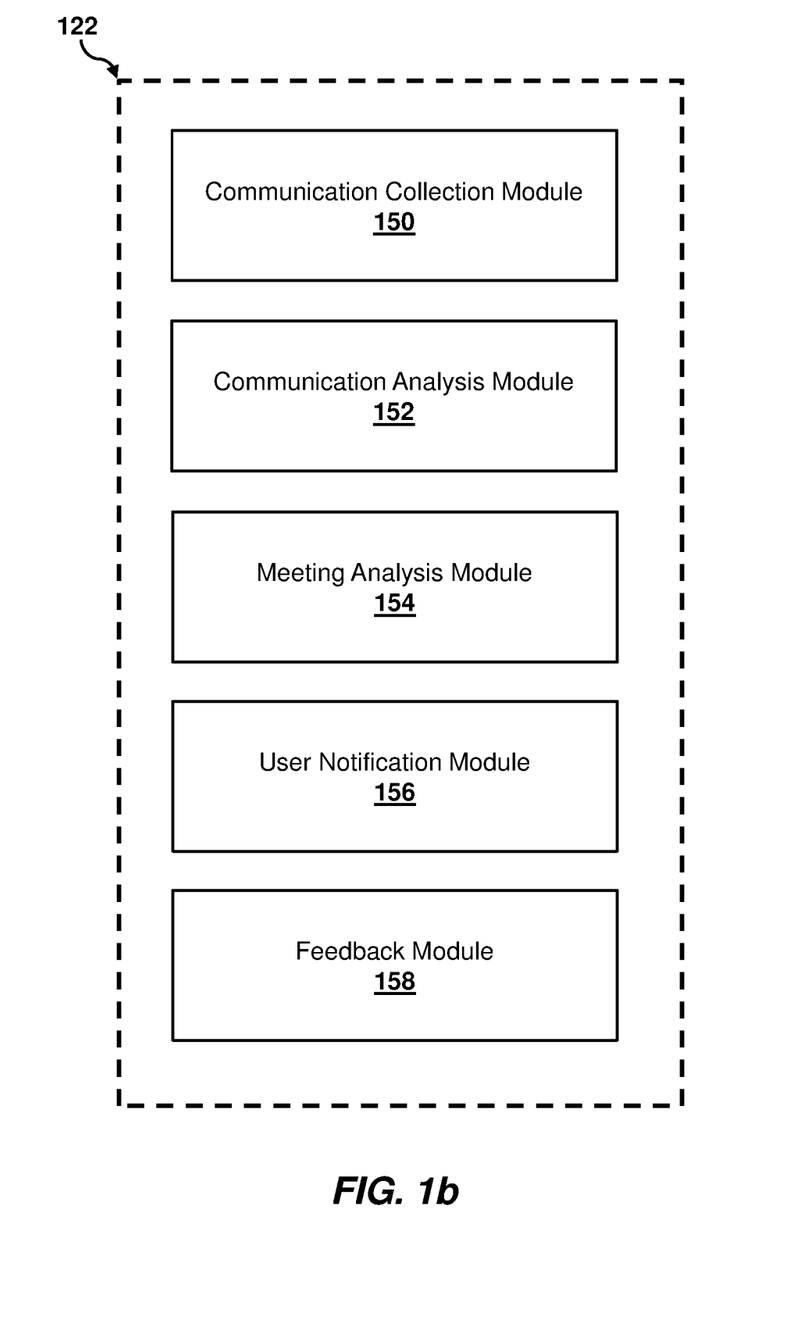

FIG. 1b illustrates example modules of communications analysis and participation recommendation program 122. In an example embodiment, the communications analysis and participation recommendation program 122 may include five modules: communication collection module 150, communication analysis module 152, meeting analysis module 154, user notification module 156, and feedback module 158.

The communication collection module 150 collects communications of one or more users from the user devices 110a, 110b, 110c, and the secondary server 130. The communication collection module 150 may collect one or more users' communications on the applications 114a, 114b, 114c which may be collected and stored on the program database 124. The communications may be, but are not limited to, verbal and written communications. Verbal communications may be converted to text, using known voice to text conversion methodologies, to enable the communications analysis and participation recommendation program 122 to analyze the communications. In one embodiment, the communications analysis and participation recommendation program 122 may monitor all communications between the three co-workers such as but not limited to, verbal presentations, questions asked, responses to questions, written questions, written responses to questions, chat messages, etc. In another embodiment, the communications analysis and participation recommendation program 122 may analyze the application data 136 and any data on the user databases 116a, 116b, 116c for user communications. For example, the communications analysis and participation recommendation program 122 may monitor an electronic meeting between three co-workers, using the user devices 110a, 110b, 110c, on the applications 114a, 114b, 114c, respectively. The communication collection module 150 may store the collected communications of the one or more users on the program database 124.

The communication analysis module 152 analyzes the collected one or more users' communications to identify a user contribution pattern for the one or more users. The communication analysis module 152 may analyze the characteristics of the collected users' communications and any responses to the users' communications such as, but not limited to, opinions on another user's communication, positive communication, negative communication, etc. Continuing with the example above, the communication analysis module 152 may analyze the characteristics of the collected communications between three co-workers. The communication analysis module 152 may analyze the characteristics of any responses to the users' communications such as, but not limited to, positive reactions, negative reactions, questions asked in response, etc. For example, the communication analysis module 152 may analyze the responses of the co-workers associated with the user devices 110b, and 110c to a communication given by a co-worker associated with the user device 110a. The communication analysis module 152 may analyze the collected communications using known cognitive systems and methodologies such as, but not limited to, IBM Watson® APIs for sentiment analysis, qualitative analysis for stored unstructured data, conversion of voice to text, emotion analysis, and concept/category/keyword identification. The communication analysis module 152 may then analyze the collected communications to identify a user contribution pattern for each of the one or more users. For example, the communication analysis module 152 may identify a user contribution pattern that includes, but is not limited to, concepts, statements and proposals made by a user on the user device 110a, the reactions of the users on the user devices 110b, 110c, and typical questions posed by the user of the user device 110a, etc.

The meeting analysis module 154 may collect and analyze communications that occur on any of the user devices 110a, 110b, 110c connected to the communications analysis and participation recommendation system 100 and identify opportunities for a user to participate based on the identified user's contribution pattern. For example, the meeting analysis module 154 may identify concepts and questions raised during a meeting that a user has responded to in the past and whether or not the user's past response was positively received by the other meeting attendees. Also, the communications analysis and participation recommendation program 122 may identify answers to questions provided during a meeting to which a user typically asks. The user does not need to be in attendance of a meeting in order for the meeting analysis module 154 to collect and analyze communications that occur on any of the user devices 110a, 110b, 110c. For example, a user of the user device 110c may be in a meeting with 5 co-workers, which does not include the user of the user device 110a. The user of the user device 110a may not be present at the meeting for several reasons including, but not limited to, the user is running late, the user has missed the meeting, the user was not invited to the meeting, etc. The meeting analysis module 154 may for example, but not limited to, collect and analyze the communications of the meeting between the user of the user device 110c and the 5 co-workers and identify a communication to which the user of the user device 110a may be able to positively respond to based on the identified contribution pattern for the user of the user device 110a. For example, the meeting analysis module 154 may identify, but is not limited to, a question posed by the user of the user device 110c or by one of the 5 co-workers present in the meeting to which the user of the user device 110a has previously answered and that answer previously received a positive response. As another non-limiting example, the meeting analysis module 154 may identify a question posed by the user of the user device 110a in a previous meeting to which an answer has been provided to in the meeting between the user of the user device 110c and the 5 other co-workers.

The user notification module 156 may generate a notification to the user of an identified opportunity to participate. The user notification module 156 may notify the user of an identified opportunity to participate via the user interface 112a, 112b, 112c on the user device 110a, 110b, 110c. The notification may be any type of electronic notification such as, but not limited to, a pop-up notification, an email, a message on the user interface 112a, 112b, 112c, etc. The notification may include, but is not limited to, a notification of an opportunity to respond to a question, a notification that a typical question of the user has been answered, a notification that a topic which the user is familiar with is being discussed, etc. For example, the user of the user device 110a may receive a notification via the user interface 112a that a question to which the user has previously answered has been asked in a meeting which the user is not currently attending. Further, the notification may include a summary of the meeting. The summary may include, but is not limited to, a summary of the communications relating to the identified opportunity, or a summary of the entire meeting. For example, if a user comes to a meeting 15 minutes late, the user notification module 156 may notify the user that a problem to which the user has a unique ability to solve has been asked and the user notification module 156 may give a summary of the problem and any solutions offered before the user entered the meeting. This way the user will know if he/she should circle back to the problem at an appropriate time.

The feedback module 158 may receive user feedback on an notified opportunity to participate. For example, the user of the user device 110a, 110b, 110c may enter feedback via the user interface 112a, 112b, 112c such as, but not limited to, a notified opportunity was of interest, or a notified opportunity was not of interest, etc. Further, the user of the user device 110a, 110b, 110c may identify to what degree a notified opportunity was of interest to the user such as, but not limited to, very interesting, somewhat interesting, neutral, somewhat not interesting, not interesting, etc. The feedback module 158 may utilize the user feedback to update the user contribution pattern.

Figure 2:
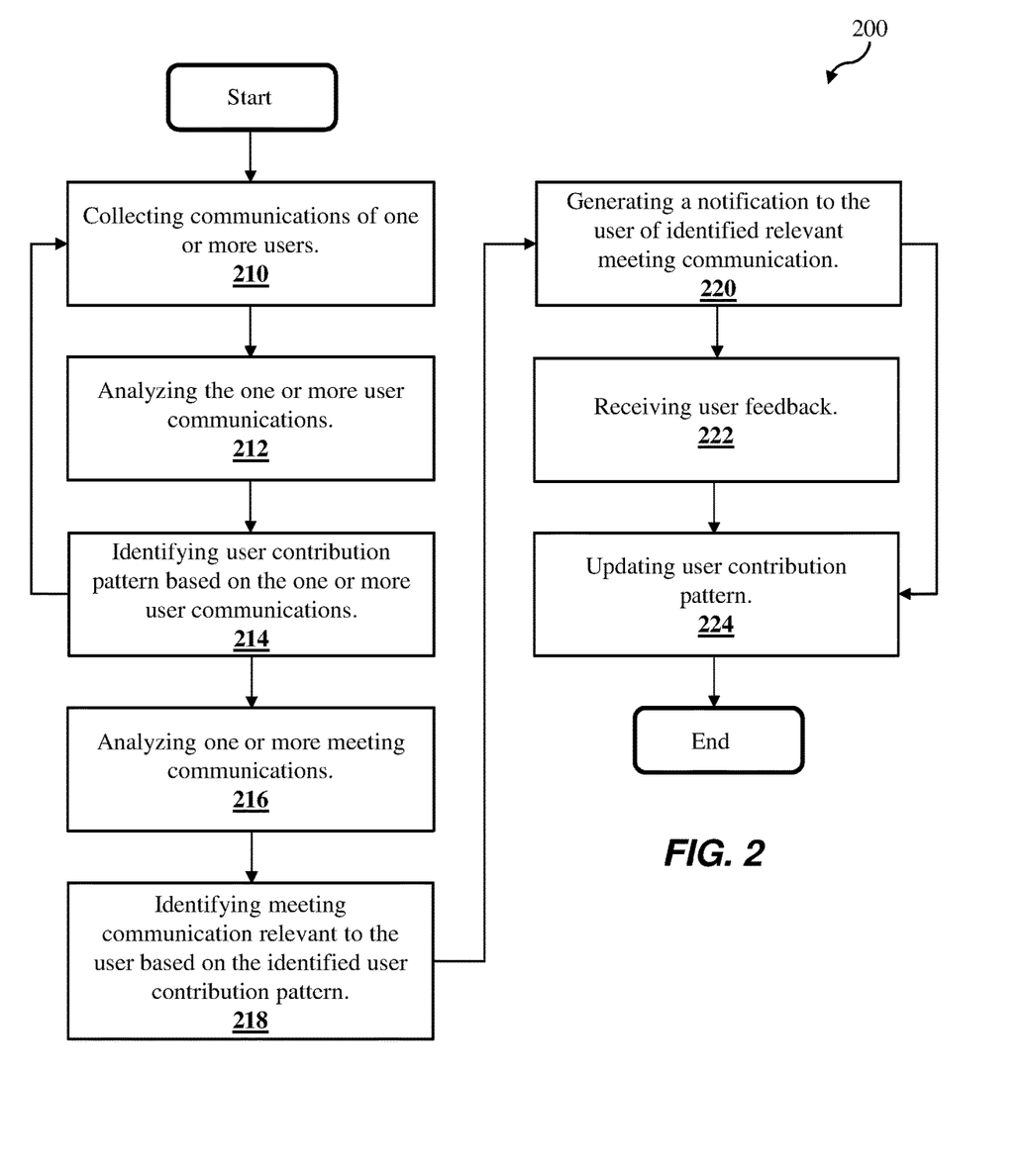
FIG. 2 is a flowchart illustrating an example method executed by the communications analysis and participation recommendation system in accordance with an embodiment of the invention.

Referring to FIG. 2, a method 200 executed by the communications analysis and participation recommendation system 100 is depicted, in accordance with an embodiment of the present invention.

Referring to operation 210, the communication collection module 150 collects communications of one or more users from the user devices 110a, 110b, 110c, and the secondary server 130. Communication collection is described in more detail above with reference to the communication collection module 150.

Referring to operation 212, the communication analysis module 152 analyzes the collected one or more users' communications. Communication analysis is described in more detail above with reference to the communication analysis module 152.

Referring to operation 214, communication analysis module 152 identifies a user contribution pattern for the one or more users. User contribution pattern identification is described in more detail above with reference to the communication analysis module 152.

Operations 210-214 may be repeated for any number users on the communications analysis and participation recommendation system 100.

Referring to operation 216, the meeting analysis module 154 collects and analyzes communications that occur on any of the user devices 110a, 110b, 110c connected to the communications analysis and participation recommendation system 100. Meeting communication collection and analysis is described in more detail above with reference to the meeting analysis module 154.

Referring to operation 218, the meeting analysis module 154 identifies opportunities for a user of the user devices 110a, 110b, 110c to participate based on the identified user's contribution pattern. Participation opportunity identification is described in more detail above with reference to the meeting analysis module 154.

Referring to operation 220, the user notification module 156 generates a notification to the user of an identified opportunity to participate. Notification generation identification is described in more detail above with reference to the user notification module 156.

Referring to operation 222, the feedback module 158 receives user feedback on the notified opportunity to participate. User feedback is described in more detail above with reference to the feedback module 158. Operation 222 may be optional and the communications analysis and participation recommendation system 100 may optionally not perform operation 222 if no user feedback is received.

Referring to operation 224, the feedback module 158 updates the user contribution pattern. User contribution pattern update is described in more detail above with reference to the feedback module 158.

Figure 3:
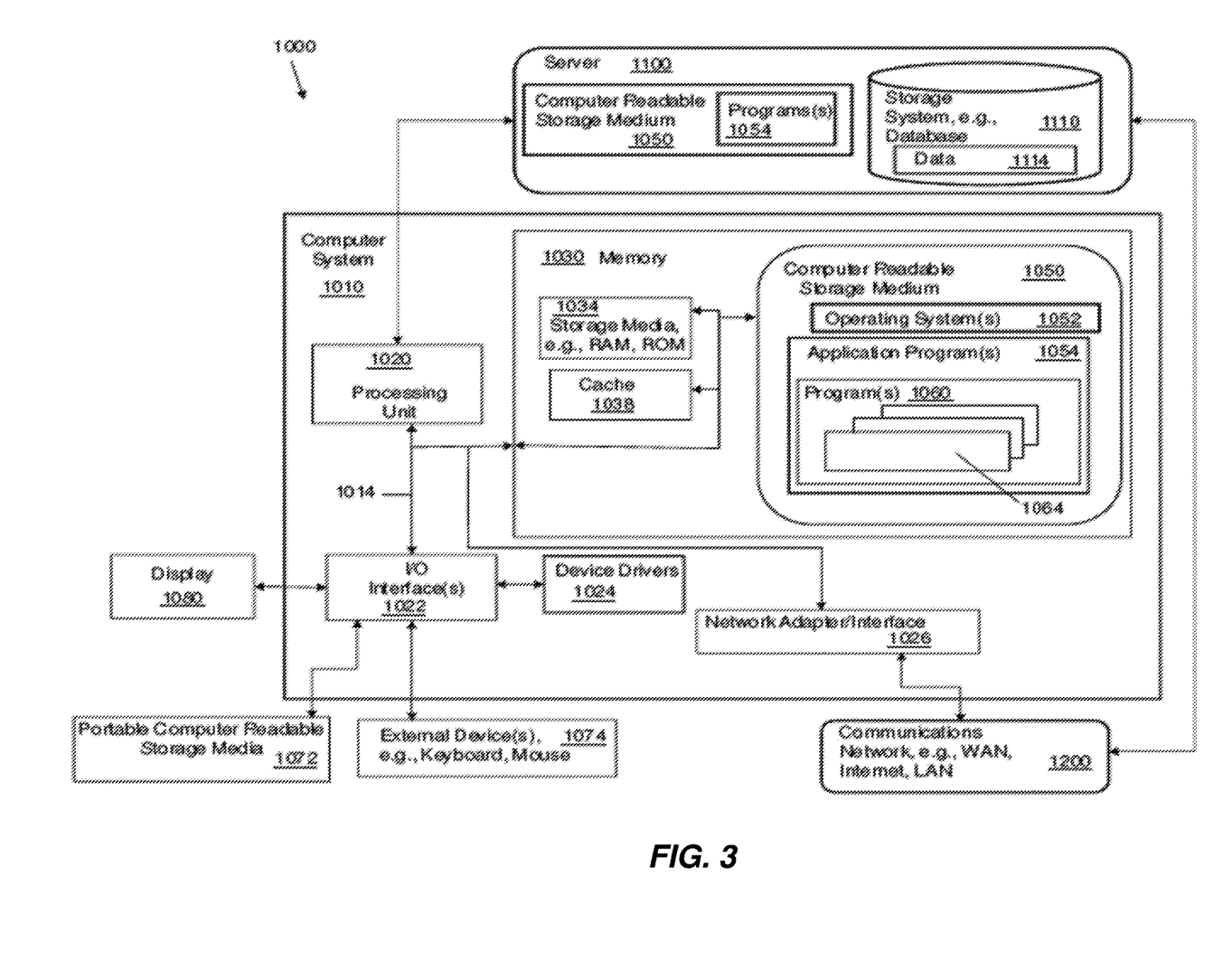
FIG. 3 is a block diagram depicting the hardware components of the communications analysis and participation recommendation system of FIG. 1, in accordance with an embodiment of the invention.

Referring to FIG. 3, a system 1000 includes a computer system or computer 1010 shown in the form of a generic computing device. The method 200 for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIG. 2), for example, may be embodied in one or more computer programs, generically referred to as a program(s) 1060 and can be stored in memory 1030 in the computer readable storage medium 1050. The program 1060 can include program modules 1064. The program modules 1064 can generally carry out functions and/or methodologies of embodiments of the invention as described herein. For example, the program modules 1064 can include the modules 150-158 described above with reference to FIG. 1b. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
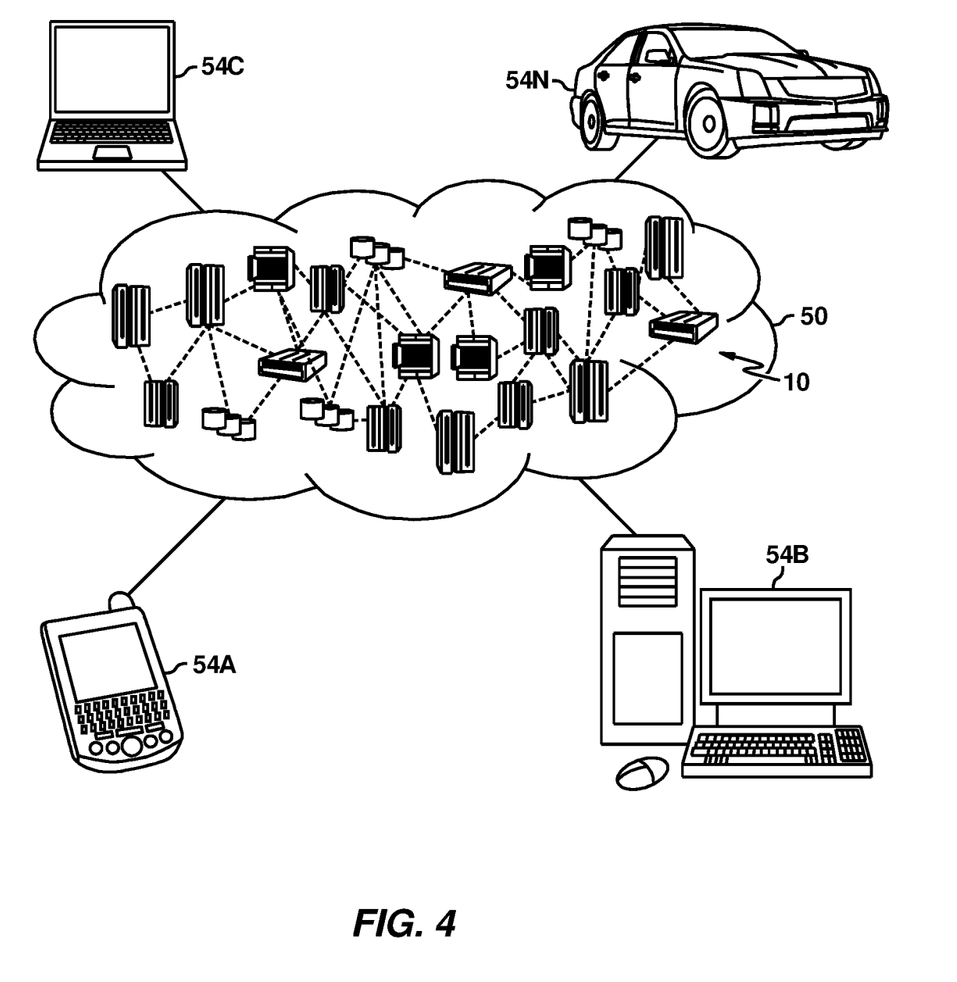
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
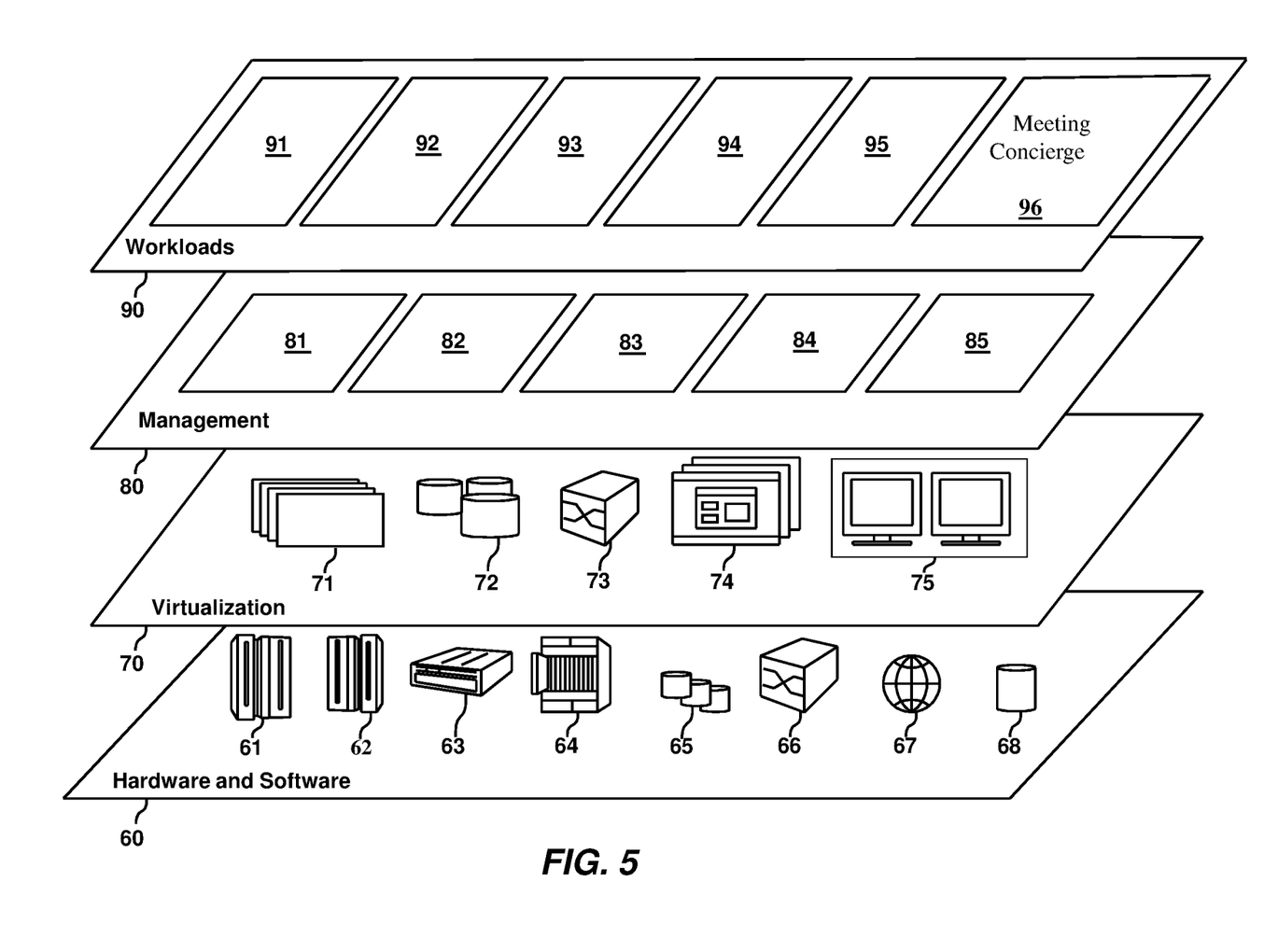
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and meeting concierge 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for communications analysis and participation recommendation, the method comprising:
    collecting, by a computer device, communications of a user;
    analyzing, by the computing device, the communications of the user;
    identifying, by the computing device, a user contribution pattern for the user, wherein identifying the user contribution pattern comprises identifying and analyzing user statements and reactions made by the user in a history of communications, and using the identified and analyzed user statements and reactions to determine a pattern of user statements and reactions that are typically contributed by the user to certain communications; and
    identifying opportunities for the user to participate in different communications based on the identified user contribution pattern.

2. A method as in claim 1, further comprising:
    analyzing, by the computing device, one or more conversations;
    identifying, by the computing device, a conversation relevant to the user based on the identified user contribution pattern; and
    generating, by the computing device, in response to identifying a relevant conversation, a notification to the user of the relevant conversation.

3. A method as in claim 1, further comprising:
    receiving, by the computing device, in response to the generated notification, feedback from the user on the identified relevant conversation; and
    updating, by the computing device, the user contribution pattern based on the received feedback.

4. A method as in claim 1, wherein analyzing, by the computing device, the communications of the user further comprises:
    analyzing, by the computing device, characteristics of the communications of the user.

5. A method as in claim 1, wherein the user contribution pattern comprises one or more of the group consisting of: concepts made by the user, statements made by the user, proposals made by the user, the reactions of secondary users to communications made by the user, questions posed by the user, and questions answered by the user.

6. A method as in claim 2, wherein the one or more conversations occur at a conversation to which the user is not present.

7. A method as in claim 2, wherein the notification to the user of the relevant conversation comprises a summary of all communications relating to the relevant conversation.

8. A computer program product for communications analysis and participation recommendation, the computer program product comprising:
- a computer-readable storage medium having program instructions embodied therewith, wherein the computer readable storage medium is not a transitory signal per se, the program instructions comprising:
  - program instructions to collect, by a computer device, communications of a user;
  - program instructions to analyze, by the computing device, the communications of the user; and
  - program instructions to identify, by the computing device, a user contribution pattern for the user, wherein identifying the user contribution pattern comprises identifying and analyzing user statements and reactions made by the user in a history of communications, and using the identified and analyzed user statements and reactions to determine a pattern of user statements and reactions that are typically contributed by the user to certain communications; and
  - program instructions to identify opportunities for the user to participate in different communications based on the identified user contribution pattern.

9. A computer program product as in claim 8, wherein the program instructions further comprise:
- program instructions to analyze, by the computing device, one or more conversations;
- program instructions to identify, by the computing device, a conversation relevant to the user based on the identified user contribution pattern; and
- program instructions to generate, by the computing device, in response to identifying a relevant conversation, a notification to the user of the relevant conversation.

10. A computer program product as in claim 8, wherein the program instructions further comprise:
- program instructions to receive, by the computing device, in response to the generated notification, feedback from the user on the identified relevant conversation; and
- program instructions to update, by the computing device, the user contribution pattern based on the received feedback.

11. A computer program product as in claim 8, wherein the program instructions to analyze, by the computing device, the communications of the user further comprise:
- program instructions to analyze, by the computing device, characteristics of the communications of the user.

12. A computer program product as in claim 8, wherein the user contribution pattern comprises one or more of the group consisting of: concepts made by the user, statements made by the user, proposals made by the user, the reactions of secondary users to communications made by the user, questions posed by the user, and questions answered by the user.

13. A computer program product as in claim 9, wherein the one or more conversations occur at a conversation to which the user is not present.

14. A computer program product as in claim 9 wherein the notification to the user of the relevant conversation comprises a summary of all communications relating to the relevant conversation.

15. A computer system for communications analysis and participation recommendation, the system comprising:
- one or more computer processors, one or more computer-readable storage media, and program instructions stored on one or more of the computer-readable storage media for execution by at least one of the one or more processors, the program instructions comprising:
  - program instructions to collect, by a computer device, communications of a user;
  - program instructions to analyze, by the computing device, the communications of the user;
  - program instructions to identify, by the computing device, a user contribution pattern for the user, wherein identifying the user contribution pattern comprises identifying and analyzing user statements and reactions made by the user in a history of communications, and using the identified and analyzed user statements and reactions to determine a pattern of user statements and reactions that are typically contributed by the user to certain communications; and
  - program instructions to identify opportunities for the user to participate in different communications based on the identified user contribution pattern.

16. A computer system as in claim 15, wherein the program instructions further comprise:
- program instructions to analyze, by the computing device, one or more conversations;
- program instructions to identify, by the computing device, a conversation relevant to the user based on the identified user contribution pattern; and
- program instructions to generate, by the computing device, in response to identifying a relevant conversation, a notification to the user of the relevant conversation.

17. A computer system as in claim 15, wherein the program instructions further comprise:
- program instructions to receive, by the computing device, in response to the generated notification, feedback from the user on the identified relevant conversation; and
- program instructions to update, by the computing device, the user contribution pattern based on the received feedback.

18. A computer system as in claim 15, wherein the program instructions to analyze, by the computing device, the communications of the user further comprise:
- program instructions to analyze, by the computing device, characteristics of the communications of the user.

19. A computer system as in claim 15, wherein the user contribution pattern comprises one or more of the group consisting of: concepts made by the user, statements made by the user, proposals made by the user, the reactions of secondary users to communications made by the user, questions posed by the user, and questions answered by the user.

20. A computer system as in claim 16, wherein the one or more conversations occur at a conversation to which the user is not present.

* * * * *

UNITED STATES PATENT AND TRADEMARK OFFICE
CERTIFICATE OF CORRECTION

PATENT NO. : 10,938,589 B2
APPLICATION NO. : 16/205634
DATED : March 2, 2021
INVENTOR(S) : Asima Silva, Richard Gorzela and Jamie Mae Stockton It is certified that error appears in the above-identified patent and that said Letters Patent is hereby corrected as shown below:

On the Title Page

Column 1, item (72) Inventors: should read as follows:
Asima Silva, Holden, MA (US);
Richard Gorzela, Billerica, MA (US);
Jaime Mae Stockton, Groton, MA (US)

Signed and Sealed this
First Day of August, 2023

Katherine Kelly Vidal
*Director of the United States Patent and Trademark Office*